US010062478B2

(12) United States Patent
Tamada et al.

(10) Patent No.: US 10,062,478 B2
(45) Date of Patent: Aug. 28, 2018

(54) SUPERCONDUCTING CABLE HAVING OUTGOING COOLANT INSIDE A CONDUCTOR AND RETURN COOLANT OUTSIDE THE CONDUCTOR, AND DEVICE AND METHOD FOR COOLING SUPERCONDUCTING CABLE

(71) Applicant: RAILWAY TECHNICAL RESEARCH INSTITUTE, Tokyo (JP)

(72) Inventors: Noriharu Tamada, Tokyo (JP); Masaru Tomita, Tokyo (JP)

(73) Assignee: RAILWAY TECHNICAL RESEARCH INSTITUTE, Tokyo (JP)

( * ) Notice: Subject to any disclaimer, the term of this patent is extended or adjusted under 35 U.S.C. 154(b) by 27 days.

(21) Appl. No.: 14/365,428

(22) PCT Filed: Dec. 14, 2012

(86) PCT No.: PCT/JP2012/082469
§ 371 (c)(1),
(2) Date: Jun. 13, 2014

(87) PCT Pub. No.: WO2013/089219
PCT Pub. Date: Jun. 20, 2013

(65) Prior Publication Data
US 2014/0378312 A1 Dec. 25, 2014

(30) Foreign Application Priority Data

Dec. 14, 2011 (JP) ................................. 2011-273750

(51) Int. Cl.
*H01B 12/16* (2006.01)
*B60M 3/00* (2006.01)
(Continued)

(52) U.S. Cl.
CPC ............... *H01B 12/16* (2013.01); *B60M 3/00* (2013.01); *H01B 12/14* (2013.01); *H02G 15/34* (2013.01)

(58) Field of Classification Search
CPC ............ H01F 6/065; H01R 4/68; H01B 12/16
(Continued)

(56) References Cited

U.S. PATENT DOCUMENTS 3,470,828 A * 10/1969 Powell, Jr. .............. B60L 13/04
104/281
3,646,243 A * 2/1972 Graneau et al. ............. 174/15.5
(Continued)

FOREIGN PATENT DOCUMENTS

JP 07-14443 A 1/1995
JP 0864041 A 3/1996
(Continued)

OTHER PUBLICATIONS

Handbook of Applied Superconductivity, Bernd Seeber, Istitute of Physics Publishing, 1998, p. 1669.*
(Continued)

*Primary Examiner* — Hoa C Nguyen
*Assistant Examiner* — Stanley Tso
(74) *Attorney, Agent, or Firm* — Rossi, Kimms & McDowell LLP

(57) ABSTRACT

A superconducting cable comprises a superconductor 60, two or more coolant passages including an outgoing coolant passage 12 and a returning coolant passage 14 that transfer a coolant that cools the superconductor, and a heat insulating pipe 10 inside which the superconductor 60 and the coolant passages are formed. For the coolant passages, by a double structured tube of an inner tube 6 and an outer tube 8, the outgoing coolant passage 12 is formed in the internal space of the inner tube 6 and the returning coolant passage 14 is
(Continued)

formed in the space between the inner tube 6 and the outer tube 8, the inner tube 6 is formed between the outgoing coolant passage 12 and the returning coolant passage 14 of a heat insulating material, the superconductor 60 is disposed on the outer circumferential side of the inner tube 6, and the superconductor is cooled by the coolant that flows through the returning coolant passage.

8 Claims, 5 Drawing Sheets

(51) Int. Cl.
*H01B 12/14* (2006.01)
*H02G 15/34* (2006.01)

(58) Field of Classification Search
USPC .............. 174/15.4, 15.5; 165/168; 505/163
See application file for complete search history.

(56) References Cited

U.S. PATENT DOCUMENTS

| | | | |
|---|---|---|---|
| 6,354,087 B1* | 3/2002 | Nakahara | F17C 13/02 62/6 |
| 2006/0180328 A1* | 8/2006 | Masuda | H01B 12/16 174/15.5 |
| 2007/0107443 A1 | 5/2007 | Royal et al. | |
| 2008/0090732 A1* | 4/2008 | Hirose | 505/230 |
| 2008/0293575 A1 | 11/2008 | Hirose et al. | |
| 2009/0192042 A1* | 7/2009 | Kim | H01B 12/16 505/230 |
| 2011/0294669 A1* | 12/2011 | Stemmle et al. | 505/163 |
| 2012/0089525 A1* | 4/2012 | Kley | B61B 13/08 705/315 |
| 2012/0091144 A1* | 4/2012 | Baumgartner et al. | 220/560.04 |
| 2012/0186854 A1* | 7/2012 | Choi | H01R 4/68 174/22 R |

FOREIGN PATENT DOCUMENTS

| | | |
|---|---|---|
| JP | 08-287750 A | 11/1996 |
| JP | 2000118270 A | 4/2000 |
| JP | 2002-056729 A | 2/2002 |
| JP | 2006156328 A | 6/2006 |
| JP | 2009-009908 A | 1/2009 |
| JP | 2009-516354 A | 4/2009 |
| JP | 2011-054500 A | 3/2011 |
| JP | 2011-076750 A | 4/2011 |
| WO | 2011112485 A1 | 9/2011 |

OTHER PUBLICATIONS

English Translation of International Preliminary Report on Patentability for PCT/JP2012/082469, dated Mar. 19, 2013. Previously cited in the IDS filed Jun. 13, 2014.

International Search Report for PCT/JP2012/082469, dated Mar. 19, 2013.

Extended European Search Report issued in EP12857601.4, dated Jul. 24, 2015.

Office Action issued in JP2011-273750, dated Dec. 25, 2015.

* cited by examiner

SUPERCONDUCTING CABLE HAVING OUTGOING COOLANT INSIDE A CONDUCTOR AND RETURN COOLANT OUTSIDE THE CONDUCTOR, AND DEVICE AND METHOD FOR COOLING SUPERCONDUCTING CABLE

TECHNICAL FIELD

This invention relates to a superconducting cable, and a device and a method for cooling a superconducting cable.

BACKGROUND

Superconductivity is a phenomenon of electric resistance rapidly becoming zero in a substance such as a certain metal, alloy, and compound when cooled to the ultra-low temperature. A superconducting cable, which is manufactured by applying the technology of superconductivity and used in electric transmission, is used as a conductor where electricity transmits through the superconducting line. This superconducting cable is attracting attention for its advantages such as reducing the size of the facilities for electric transmission, and improving the efficiency of electric transmission because the superconducting cable is capable of transmitting high current with smaller cross-sectional area.

It is important to keep cooling and to maintain the ultra-low temperature state upon using the superconducting cable for electric transmission so as not to reduce the efficiency of electric transmission by loss of superconducting ability due to temperature increase caused by heat load by usage or heat transfer from outside. As a technology to cool the superconducting cable, known is a technology of cyclic cooling using coolant such as the liquid nitrogen. This is to cool the superconducting cable with a cooled coolant by cooling the coolant with a refrigerator and transferring the cooled coolant to the superconducting cable with a pump. For instance, Patent Document 1 discloses a technology of cooling a superconducting cable by circulating coolant in a unicursal path including a refrigerator, a superconducting cable, a pump, and the refrigerator in this order.

The superconducting cable is occasionally considered and actually employed for use as an alternate current (AC) superconducting cable by an electric power company, for instance. The AC superconducting cable considered and used by an electric power company and the like is used as an electric instrument for supplying electricity to a major consumer of electricity such as the skyscrapers from the underground channel called the cable tunnel. Thus, the AC superconducting cable needs to be provided with power leads that serve as connection for transmitting electricity from outside. Herein, for the AC superconducting cable for electric transmission, providing a power lead for each of both ends of the AC superconducting cable is sufficient. Also, for the AC superconducting cable for electric transmission, two or more lines of superconducting cables for electric transmission are provided in order to stabilize the power supply.

As a result, for the AC superconducting cable for electric transmission, it is not necessary to separately provide a returning line for the coolant by using one of the lines for the outgoing coolant and the other for the returning coolant in the cooling system of the superconducting cable for electric transmission. Thus, it is possible to circulate the coolant while effectively using its low temperature. Also, even when only one line of AC superconductive cable for electric transmission is provided, since the AC superconducting cable for electric transmission is a three-phase AC cable, it is not necessary to separately provide a returning line for the coolant by using one phase for outgoing and the other two phases for returning, which makes it possible to circulate the coolant while effectively using its low temperature.

On the other hand, the superconducting cable may be used not only as the AC electric transmission cable, but also as the superconductive feeder cable for the electric railway, for instance.

Currently, electricity is supplied to the electric railway via the pantograph and the trolley line. Since the trolley line is such a thin line that has high electric resistance, electricity is supplied to the trolley line from the feeder cable approximately every 300 meters to prevent voltage drop in an electric railway vehicle. Therefore, a thick line is used for the feeder cable to make its electric resistance extremely low so as to prevent voltage drop. However, it is impossible to avoid voltage drop because even the lowest electric resistance is a finite resistance. Thus, the feeder cables are provided approximately every three kilometers. Although the feeder cable can be used not only for direct electricity supply to the electric railway but also for interchange of electricity between substations such as supplying regenerative electric power of an electric railway vehicle to another vehicle that is speeding up, it is incapable of performing two electric transmissions at the same time. Thus, the feeder cable normally takes its role mainly on transmitting electricity to a railway vehicle. Further, as most of the electric railways in Japan use direct current, employing the superconducting cables as the feeder cables causes the electric resistance to become zero, which results in various advantages such as expanding the intervals between the substations, omitting some of the substations, and solving the problem of electric erosion by all electricity returning to the substations via the superconducting cable.

CITATION LIST

Patent Literature

Patent Document 1: JP2009-5163540A

SUMMARY

Technical Problem

However, the superconducting feeder cable used for the electric railway is for instance different from the above AC superconducting cables for electric transmission in that a large number of power leads are required for supplying electricity to the trolley line and thus the current branch from the cable needs to have a simple structure, which varies the configuration of the circulating system for the coolant from the cables for electric transmission.

Also, in the case of the superconductive feeder cable for the electric railway, there may be only one line provided. Thus, it is impossible to use one line for outgoing and the other for returning as in the AC electric transmission cable. Further, as the superconductive cable has direct current, it is also impossible to use one phase for outgoing and the other two phases for returning as in the three-phase AC cable. Therefore, the low temperature of the coolant can be used only for outgoing, which prevents the effective use of the low temperature of the coolant.

It may be considered to provide two or more superconducting feeder cables so as to effectively use the low temperature of the coolant in circulation without separately providing a returning line for the coolant, but this is not realistic. In this case, two or more superconductive cables will be provided beyond necessity, which increases the cost for providing the superconducting feeder cables itself, and also increases the cable in size, causing the configuration to be more complicated.

Accordingly, with regard to the problem of the above prior art, an object of the present invention is to provide, for a superconducting cable of direct current laid in only one line like the superconducting feeder cable, a superconducting cable, and a device and a method for cooling the superconducting cable which are capable of effective cyclic use of the low temperature of the coolant without separately providing a returning line for the coolant.

Solution to Problem

In order to solve the above problem, according to the present invention, a superconducting cable comprises: a superconductor; two or more coolant passages including an outgoing coolant passage and a returning coolant passage that transfer a coolant that cools the superconductor, and a heat insulating pipe inside which the superconductor and the coolant passages are formed,
wherein, for the coolant passages, by a double structured tube of an inner tube and an outer tube, the outgoing coolant passage is formed in an internal space of the inner tube and the returning coolant passage is formed in a space between the inner tube and the outer tube, wherein a heat insulating material is disposed between the outgoing coolant passage and the returning coolant passage, wherein the superconductor is disposed on an outer circumferential side of the heat insulating material, and wherein the superconductor is cooled by the coolant that flows through the returning coolant passage.

As a result, it is possible to secure the circulation path of the coolant even in a single superconducting cable without separately providing a returning line for the coolant.

Also, a second superconductor may be disposed inside the outgoing coolant passage.

As a result, it is possible to considerably improve the efficiency of power use that is capable of achieving two separate power transmission systems.

For instance, in the case where the superconducting cable according to the present invention is employed for the electric railway, using the superconductor disposed on the outer side as a superconducting cable to which a large number of power leads are connected makes it easier to achieve a part for drawing out electric current. In addition, by using the second superconducting cable disposed on the inner side as a superconducting cable that redistributes electricity between the substations, it is possible to considerably improve the efficiency of power use in the electric railway.

Also, the inner tube may be formed of the heat insulating material, and the superconductor may be wound around an outer surface of the inner cable.

By forming the inner tube of a heat insulating material, although depending on the volume flow V of the coolant in the returning coolant passage, it is possible to have the maximum temperature of the coolant at a point before the entry point into the superconducting cable. Thus, the maximum temperature does not occur along the cable. Accordingly, the point on which the critical current of the superconducting cable, Ic, is minimized is the point on which the coolant is discharged, which makes it easier to determine the operation maintenance or the operating limit of the superconducting cable for electric transmission. As the heat insulating material, polytetrafluoroethylene or nylon described below can be listed as an example.

Also, the inner tube may be formed of a polytetrafluoroethylene or a nylon.

Polytetrafluoroethylene and nylon have high heat insulating capacity and can be obtained easily at low cost. Also, polytetrafluoroethylene and nylon have high flexibility, which contributes to flexibility of the cable. Further, polytetrafluoroethylene and nylon are slippery and thus capable of sliding the superconducting layer wound around thereon even when heat shrinkage is caused by cooling, which prevents the superconducting layer from getting overloaded mechanically.

Also, the outer tube may be a corrugated pipe.

By using a corrugated pipe as the outer tube, it is possible to absorb the shrinkage even when heat shrinkage is caused upon cooling.

Also, the superconductor may be cooled by the coolant having a volume flow V that satisfies a relation $$h \leq CV/L,$$

where "h" is a coefficient of heat transfer of a material of the inner tube, C is a heat capacity per unit length of the coolant, and L is an entire length of the superconducting cable.

By cooling the superconducting cable with the volume flow V satisfying the above relation, it is possible to have the maximum temperature of the returning coolant at a point before the entry point to the superconducting cable. Thus, it is possible to prevent the maximum temperature from occurring along the cable.

Also, an invention related to a device for cooling the superconducting cable comprises:
the superconducting cable according to any one of claims 1 to 4;
a circulation circuit capable of returning the coolant discharged from an outlet of the returning coolant passage of the superconducting cable to an inlet of the outgoing coolant passage of the superconducting cable with a pump; and
a cooling part that cools the coolant inside the circulation circuit.

Also, the pump may have an ability to discharge the coolant having a volume flow V that satisfies a relation $$h \leq CV/L,$$

where "h" is a coefficient of heat transfer of a material of the inner tube, C is a heat capacity per unit length of the coolant, and L is an entire length of the superconducting cable.

With the volume flow V satisfying the above relation, it is possible to have the maximum temperature of the returning coolant at a point before the entry point to the superconducting cable. Thus, it is possible to prevent the maximum temperature from occurring along the cable.

Also, an invention of a cooling method of for the superconducting cable according to any one of claims 1 to 4, comprises the steps of:
while supplying the coolant to the outgoing coolant passage continuously,
taking the coolant out from the returning coolant passage;
cooling the coolant taken out from the returning coolant passage; and
supplying again the coolant to the outgoing coolant passage, whereby the coolant is cyclically used.

The coolant may be continuously supplied to the outgoing coolant passage, the coolant having a volume flow V that satisfies a relation $$h \leq CV/L,$$

where "h" is a coefficient of heat transfer of a material of the inner tube, C is a heat capacity per unit length of the coolant, and L is an entire length of the superconducting cable.

Advantageous Effects

According to the present invention, for a superconducting cable of direct current laid in only one line like the superconducting feeder cable, it is possible is to provide a device and a method for cooling the superconducting cable which are capable of effective cyclic use of the low temperature of the coolant without separately providing a returning line for the coolant.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

In implementing the invention, the inventors firstly considered the coaxial cylindrical structure that is a simple structure, as a circulation system of the coolant for the superconducting feeder cable.

Figure 1:
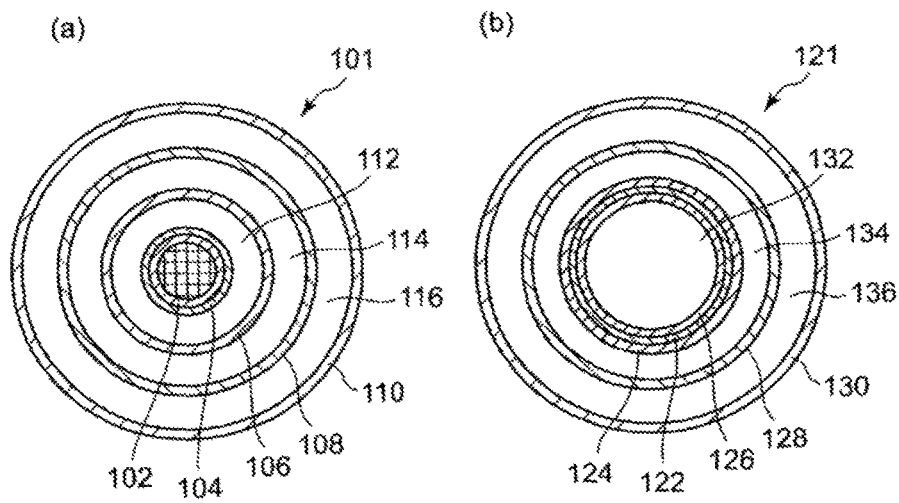
FIG. 1A and FIG. 1B are cross-sectional views of a superconducting feeder cable having a coaxial cylindrical structure.

FIGS. 1A and 1B are cross-sectional views of the possible superconducting feeder cable having a coaxial cylindrical structure. FIG. 1A is a cross sectional view of the superconducting feeder cable in the case where the superconducting cable is cooled by the outgoing flow (hereinafter, referred to as "Go-Flow") of the coolant, and FIG. 1B in the case where the superconducting cable is cooled by the returning flow (hereinafter, referred to as "Return-Flow") of the coolant.

In FIG. 1A, for the superconducting feeder line 101, the superconducting layer 102 and the shield superconducting layer 104, which are to be cooled, are coaxially inserted into an inner tube 106. The inner tube 106 is coaxially inserted into an outer tube 108, which is coaxially inserted into a vacuum sheath 110. Liquid nitrogen (hereinafter, referred to as "LN2"), being the Go-Flow coolant, flows through the space 112 formed between the shield superconducting layer 104 and the inner tube 106. LN2, being the Return Flow coolant, flows through the space 114 formed between the inner tube 106 and the outer tube 108. The space 116 between the outer tube 108 and the vacuum sheath 110 is maintained vacuum to form a heat insulating layer. In the configuration shown in FIG. 1A, the superconducting layer 102 and the shield superconducting layer 104, which are to be cooled, are cooled by the Go-Flow LN2 that flows through the space 112.

On the other hand, in FIG. 1B, for the superconducting feeder line 121, the superconducting layer 122 and the shield superconducting layer 124 to be cooled are wound around the outer circumference of an inner tube 126. The inner tube 126 is coaxially inserted into the outer tube 128 which is inserted coaxially into a vacuum sheath 130. The Go-Flow LN2 flows through the space 132 inside the inner tube 126, and the Return Flow coolant LN2 flows through the space 134 between the shield superconducting layer 124 and the outer tube 128. The space 136 between the outer tube 128 and the vacuum sheath 130 is maintained vacuum. In the configuration shown in FIG. 1B, the superconducting layer 122 and the shield superconducting layer 124, which are to be cooled, are cooled by the Return-Flow LN2 that flows through the space 134.

Generally, the Go-Flow LN2 that flows inside the inner tube has lower temperature than that of the Return-Flow LN2. Thus, from the perspective of cooling, the configuration of FIG. 1A may be considered more advantageous than the configuration of FIG. 1B. However, for the superconducting feeder cable, connection by a large number of power leads is required for supplying electricity frequently to the trolley along the superconducting feeder cable. Thus, it is difficult to achieve a structure for drawing electric current out from the power leads by the Go-Flow cooling shown in FIG. 1A, which now turns out to be not appropriate for cooling the superconducting feeder.

Thus, in the present invention, the Return-Flow cooling shown in FIG. 1B is adopted.

Herein, in the cable having the coaxial dual cooling tube structure shown in FIG. 1B, upon the LN2 for Go-Flow cooling exchanging heat with the LN2 for Return-Flow cooling, the temperature distribution of the cable does not monotonically increase along the passage, but shows a quadratic distribution as described below. In this case, there is possibility that the maximum temperature of the cable becomes higher than the temperature determined by heat load, which may cause the superconductivity to deteriorate.

The temperature distribution of the cable of for the cable having the coaxial dual cooling tube structure shown in FIG. 1B will now be described.

By formulation where the outgoing LN2 flow inside the space 132 in FIG. 1B is associated with the number "1" and the returning LN2 flow inside the space 134 with "2", the entry to the superconducting feeder 121 on the introducing side for the outgoing LN2 is x=0, the other end is x=L, and the cable is long enough to be one-dimensionally approximated, the following equation (1) can be obtained, indicating the cooled state of the cable.

$$C\frac{\partial T_1}{\partial t} = K_1 \frac{\partial^2 T_1}{\partial x^2} - CV\frac{\partial T_1}{\partial x} + h(T_2 - T_1) \qquad (1)$$

-continued $$C\frac{\partial T_2}{\partial t} = K_2 \frac{\partial^2 T_2}{\partial x^2} + CV\frac{\partial T_2}{\partial x} + h(T_1 - T_2) + q$$

Herein, C is the heat capacity per unit length. Precisely, it should be the sum of the heat capacity of the coolant LN2 and the heat capacity of the cable, but the heat capacity of the cable is small enough so that the heat capacity per unit length of the coolant LN2 can be used as their representative, which provides $C=C_p A_\rho [(J/g \cdot K)\ (cm^2)\ (g/cm^3) \rightarrow (J/cm \cdot K)]$.

Herein, $C_p$ is the specific heat at constant pressure, $\rho$ is density, and A is the cross-sectional area of the liquid nitrogen in the passage. $K_1$, and are $K_2$ are the coefficients of heat diffusion in the length direction of the cable (W/cm·K), but when obtaining the temperature distribution of the entire cable having a sufficient length, the heat diffusion in the length direction of the cable may be ignored. V is the flow rate [cm/sec] of the coolant LN2, which has the same cross-sectional area and the same flow rate for outgoing and returning but in different directions. Also, "h" is the coefficient of heat transfer per unit length between the outgoing cable and the returning cable (W/cm·K), and "q" is the amount of heat transfer from outside per unit length of the cable (W/cm). This heat is transferred only to the Return-Flow (the space 134) that flows through the outer side and no heat is transferred to the Go-Flow (the space 132) on the inner side. Given above, the following equation (2) can be obtained by solving the equation (1).

$$T_1(x) = T_0 + \frac{qLh}{(C_P m)^2}x - \frac{hq}{2(C_P m)^2}x^2 \quad (2)$$

$$T_2(x) = \left(T_0 + \frac{qL}{C_P m}\right) + \frac{q}{C_P m}\left(\frac{hL}{C_P m} - 1\right)x - \frac{hq}{2(C_P m)^2}x^2.$$

Herein, $C_p$ is the specific heat at constant pressure of the liquid nitrogen and "m" is the mass flow of the liquid nitrogen.

For the superconducting feeder cable shown in FIG. 1B, the distribution of the LN2 for Return-Flow cooling that cools the superconducting cable, $T_2(x)$, is important. As obvious from the equation (2), $T_2(x)$ comes out as a quadratic distribution, whose maximum temperature and the point that shows the maximum temperature can be obtained by the following equation (3).

$$T_{2max} = T_0 + \frac{hqL^2}{2(C_P m)^2} + \frac{q}{2h} \text{ at } x_{max} = L - \frac{C_p m}{h} \quad (3)$$

Provided that the two LN2 flows for outgoing and returning are completely insulated, "h" satisfies h=0. In this case, the LN2 flowing through the space 132 formed in the center is $T_1(x)=T_0$ and does not increase at all. As a result, the temperature distribution of Return-Flow alone becomes $T_2(x)=T_0+(q/CV)(L-x)$, which turns out as a linear temperature distribution where the temperature increases toward the entry side from the terminal end part. In this case, the point at which $T_2(x)$ reaches its maximum is the point at which the LN2 is discharged from the cable, that is, x=0, causing the maximum temperature to be $T_{2M}=T_0+qL/CV$. With this $T_{2M}$ compared to $T_{2max}$ in the equation (3), the following expression (4) is satisfied.

$$T_{2\ max}-T_{2M}=(qh/2)*(L/CV-1/h)^2>0 \quad (4)$$

The expression (4) always being true indicates that there is possibility of the temperature of the Return-Flow LN2 becoming higher than the temperature increase determined by heat load when the two LN2 flows for outgoing and returning are in thermal contact. This results in the superconducting cable being heated beyond necessity, which leads to decrease in the critic current Ic of the superconducting cable. As a result, the point of the cable at which Ic is minimized cannot be identified in real life when the region that produces the maximum temperature occurs along the cable, which makes it difficult to determine the limit capacity of the superconducting cable.

Thus, the position at which the Return-Flow LN2 (the outer side LN2) reaches the maximum temperature may be set to satisfy $x_{max} \le 0$, that is, to be outside the cable. In order to achieve this, the coefficient of heat transfer "h" between the two flows may be minimized, or the heat transfer from outside "g" may be minimized to lower the maximum temperature itself.

Figure 2:
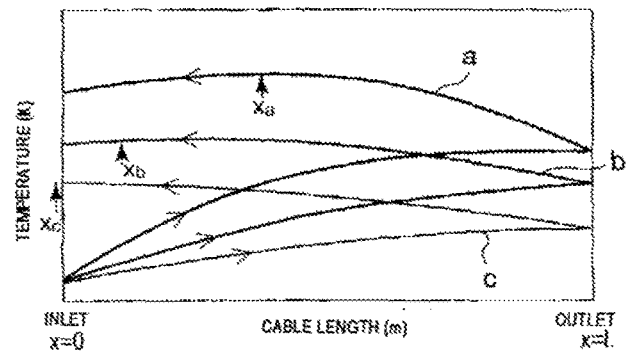
FIG. 2 is a graph of the temperature of the Return-Flow coolant LN2 while the coefficient of heat transfer "h" is changed.

FIG. 2 is a graph of the temperature of LN2 being the Return Flow coolant while the coefficient of heat transfer "h" is being changed. Y-axis is the temperature (K) of the LN2 for Return-Flow cooling and x-axis is the length (m) of the cable.

In FIG. 2, "h" is varied in the graphs "a", "b", and "c" in this order, so as to bring "h" closer to zero. As obvious from FIG. 2, in the graph "a" having the largest "h", the position $x=x_a$ where the outer side LN2 reaches the maximum temperature is the largest, and the value x decreases at $x=x_b$, $x_c$ as the coefficient of heat transfer "h" decreases in the graphs "b" and "c" in this order, becoming less than zero at $x_c$. Also, the maximum temperature of the Return-Flow LN2 also decreases in the graphs "a", "b" and "c" in this order.

That is, as in the graph "c" in FIG. 2, by setting the position where the outer LN2 reaches the maximum temperature to satisfy $x_{max} \le 0$, which is outside the cable, it is possible to avoid unnecessary heating of the superconducting cable and difficulty in determining the limit capacity of the superconducting cable as described above.

EMBODIMENTS

First Embodiment (Configuration of the Superconducting Cable)

According to the above, in the present invention, the Return-Flow LN2 as shown in FIG. 1B is used for cooling so as to decrease the coefficient of heat transfer "h". In order to decrease the coefficient of heat transfer "h", that is, to decrease the thermal contact between the outgoing LN2 and the returning LN2, a vacuum heat insulating layer may be ultimately provided between the passages for the outgoing LN2 and the passage for the returning LN2, which is however unrealistic because it requires maintaining the tubes to have a regular interval between each other accurately in order to provide a vacuum layer between the two tubes.

Thus, in the first embodiment, the coefficient of heat transfer "h" is decreased by providing a layer of heat insulating material such as polytetrafluoroethylene or nylon having high heat insulating capacity between the passage for the outgoing LN2 and the passage for the returning LN2.

Figure 3:
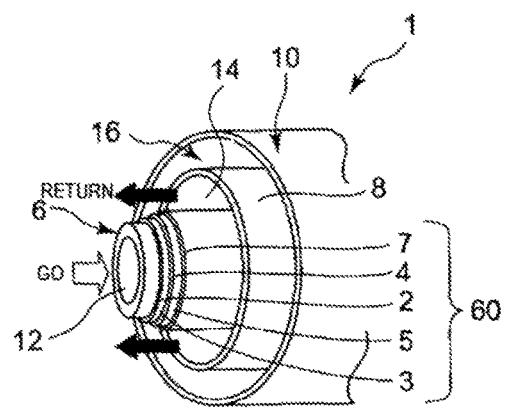
FIG. 3 is a schematic diagram of the superconducting feeder cable according to the first embodiment.
Figure 4:
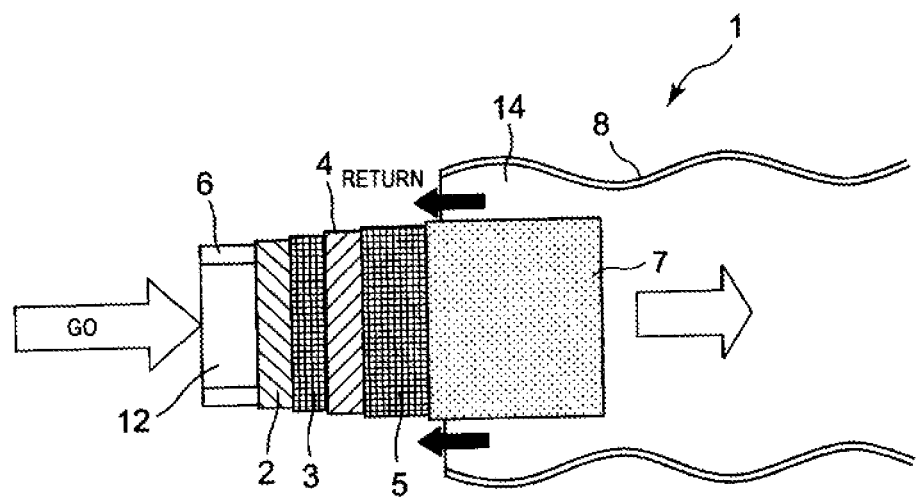
FIG. 4 is a diagram for explaining the manufacturing procedure of the superconducting feeder cable according to the first embodiment.

FIG. 3 is a schematic diagram of the superconducting feeder cable according to the first embodiment. FIG. 4 is a diagram for explaining the manufacturing procedure of the superconducting feeder cable according to the first embodiment. The configuration and manufacturing procedure of the superconducting feeder cable according to the first embodiment will be described using FIGS. 3 and 4.

In FIGS. 3 and 4, for the superconducting feeder cable 1, a tape of stabilized copper and a superconducting tape wire are wound around the outer circumference of an inner tube 6 to form a superconducting layer 2, the inner tube 6 being a pipe formed of polytetrafluoroethylene that is a heat insulating material. Next, an electric insulating paper is wound around over the superconducting layer 2 to form an electric insulating layer 3, over which a shield superconducting layer 4 is formed. Then, another electric insulating paper is wound around over the shield superconducting layer 4 to form an electric insulating layer 5, on which a conductor protective layer 7 is formed by being wound. Further, all of the inner tube 6, the superconducting layer 2, the electric insulating layer 3, the shield superconducting layer 4, the electric insulating layer 5, and the conductor protective layer 7 are inserted into an outer tube 8, which is a copper pipe having a flexible (corrugate) structure. Then, the outer tube 8 is inserted into a vacuum sheath 10 to form the superconducting feeder cable 1. In FIG. 4, the vacuum sheath 10 is omitted from the drawing.

For the superconducting cable shown in FIG. 3, the Go-Flow LN2 flows through the space 12 inside the inner tube 6, and the Return-Flow LN2 flows through the space 14 between the conductor protective layer 7 and the outer tube 8. Also, the space 16 between the outer tube 8 and the vacuum sheath 10 is maintained vacuum to form a heat insulating layer.

In the cable configuration of the superconducting feeder cable shown in FIG. 3, all the electricity-related layers including the superconducting layer 2, the electric insulating layer 3, the shield superconducting layer 4, the electric insulating layer 5, and the conductor protective layer 7 are provided on the outer side of the inner tube 6. Thus, it is easier to connect the power leads to the electricity-related layers along the cable. Also, the possibility of damaging the inner tube 6 made of polytetrafluoroethylene upon connection is reduced.

Further, by forming the inner tube 6 of polytetrafluoroethylene that is a heat insulating material, it is possible to decrease the heat transmission coefficient "h". As a result, although depending on the volume flow V of the coolant, it becomes easier to satisfy $h \leq CV/L$ in the equation (3). By satisfying $h \leq CV/L$ in the equation (3), it is possible to have the maximum temperature of the returning LN2 before the entry point of the returning flow (Return Flow) $(x \leq 0)$ as shown in the graph "c" of FIG. 2, which prevents occurrence of the maximum temperature along the cable. Also, as the critic current of the superconducting cable, Ic, is minimized at the point on which the LN2 is discharged $(x=0)$, it is possible to determine the operation maintenance or the operating limit of the superconducting cable for electric transmission.

In the first embodiment, it is possible to achieve the following advantageous effect in a cable cooling system by forming the inner tube of polytetrafluoroethylene that is a heat insulating material instead of a metal pipe.

Firstly, even with a single superconducting cable, it is possible to secure the circulation path for the LN2 being a coolant, which enables reduction in size of the cable. Also, by forming the inner tube 6 of a heat insulating material such as polytetrafluoroethylene, it is possible to avoid the thermal contact between the Go-Flow LN2 and the Return-Flow LN2, thereby bringing the temperature distribution that is unique to a coaxial dual cooling tube closer to the temperature distribution of tube cooling by the simple Flow. Also, as it is possible to have the maximum temperature in the cable at the point on which the LN2 is discharged $(x=0)$, it is easier to control the cable cooling. Also, as the superconductor 60, to which a large number of power leads need to be attached, is cooled by the returning LN2 that flows through the outer side, it is easier to achieve drawing out of the electric current. Further, polytetrafluoroethylene has high flexibility, which contributes to flexibility of the cable. Moreover, polytetrafluoroethylene is slippery and thus capable of sliding the superconducting layer wound around on the upper part even when heat shrinkage is caused by by cooling, which prevents the superconducting layer from getting overloaded mechanically.

(Device for Cooling the Superconducting Feeder Cable)

Figure 5:
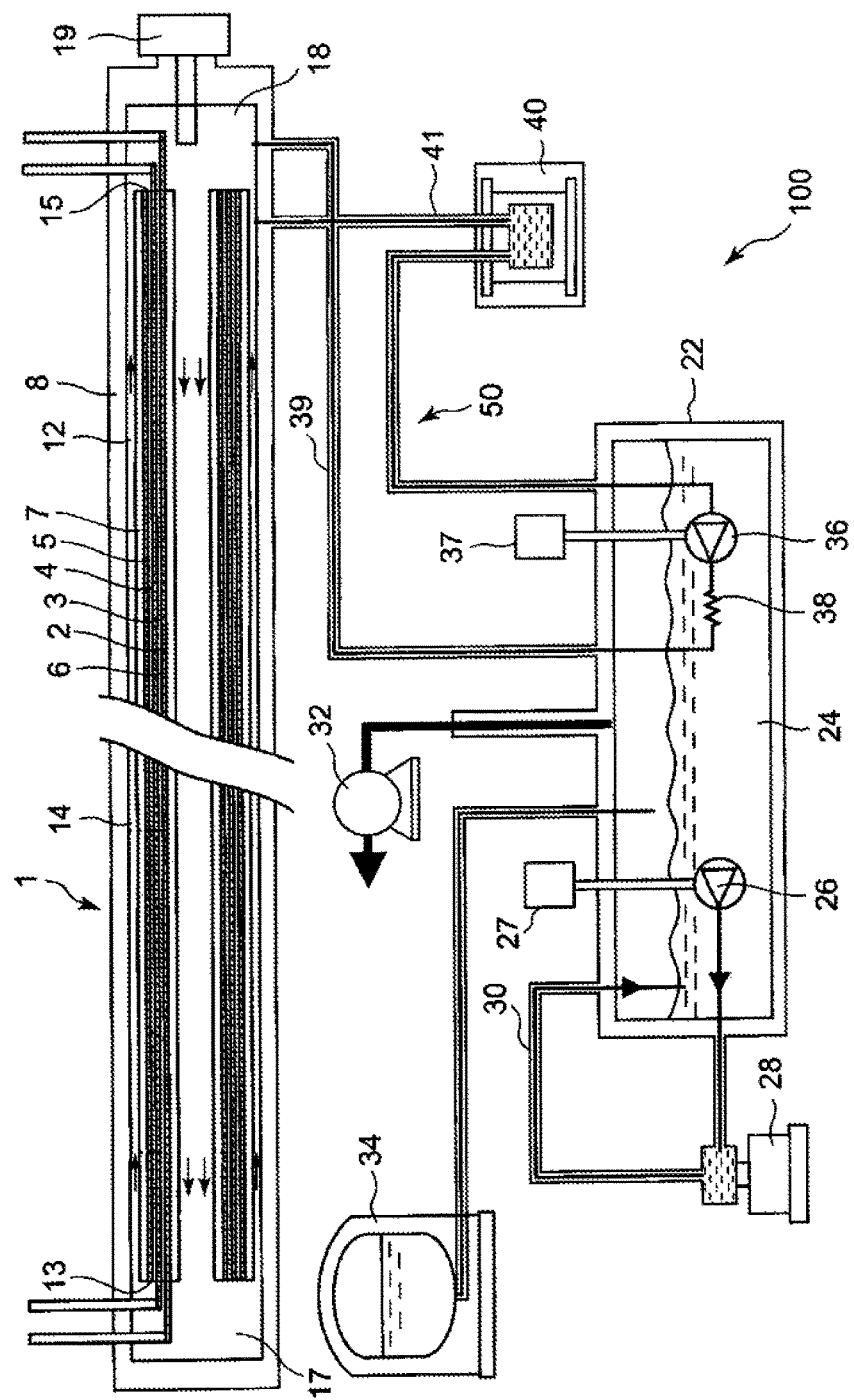
FIG. 5 is a block diagram of the configuration of the cooling device 100 for the superconducting feeder cable according to the first embodiment.

FIG. 5 is a block diagram of the configuration of the cooling device 100 for the superconducting feeder cable according to the first embodiment.

In FIG. 5, the same reference signs as those in FIGS. 3 and 4 indicate the same elements therein, whose description will be omitted.

In FIG. 5, inside the outer tube 8 included in the superconducting feeder cable 1, provided is a part into which the inner tube 6, the superconducting layer 2, the electric insulating layer 3, the shield superconducting layer 4, the electric insulating layer 5, and the conductor protective layer 7 described using FIGS. 3 and 4 are inserted. On the ends of this part, provided are a turn-back part 17 and an introducing part 18, through which the coolant NL2 is introduced. Power leads 13, 15 are provided respectively for the turn-back part 17 and the connection part 18, which are the connection part for transmitting electric current to the superconducting feeder cable 1 from outside. A refrigerator 19 is provided for the introducing part 18 for cooling the heat transferred from the power leads 13, 15. Also, an introducing pipe 39 described below is connected to the introducing part 18, and a discharging pipe 41 described below is connected to the space 14 near the end on the introducing part 18 side.

22 is a reservoir tank in which the LN2 (24) is reserved. A vacuum pump 32 is provided for the reservoir tank 24 to keep the inside vacuum. Also, the reservoir tank 24 includes a circuit 30 with a refrigerator 28 provided along the circuit 30. 26 is a pump for supplying the LN2 (24) inside the reservoir tank 24 to the circuit. 27 is a motor for the pump 26. Also, 34 is a reservoir unit for refilling when the LN2 (24) inside the reservoir tank 22 is short.

The introducing pipe 39 is connected to the introducing part 18. The introducing pipe 39 has one end connected to the introducing part 18, and the other end connected to the outlet side of the heat exchanger 38 provided inside the LN2 (24) in the reservoir tank 22. The discharging pipe 41, along which a flowmeter unit 40 is provided, is connected to the space 14 near the end on the introducing part 18 side. The discharging pipe 41 has one end connected to the space 14 as described above, and the other end connected to the inlet side of the circulation pump 36 whose outlet side is connected to the inlet side of the heat exchanger 38. Herein, 37 is the motor for driving the circulation pump 36.

Accordingly, a circulation circuit 50 is formed, providing circulation thorough the circulation pump 36, the heat exchanger 38, the introducing pipe 39, the introducing part 18, the space 12, the turn-back part 17, the space 14, the discharging pipe 41, and the circulation pump 36 in this order. The circulation circuit 50 is filled with the LN2, which is circulated in the circulation circuit 50 by the circulation pump 36 being driven.

For the cooling device 100 for the superconducting feeder cable, upon cooling the superconducting feeder cable 1, the vacuum pump 32 is firstly driven to evacuate the reservoir tank 22, as well as driving the pump 26 and the refrigerator 28. By driving the pump 26 and the refrigerator 28, the LN2 inside the reservoir tank 22 is circulated inside the circuit 30 and cooled by the refrigerator 28.

Once the LN2 inside the reservoir tank 22 is cooled, the circulation pump 36 is driven. By driving the circulation pump 36, the LN2 filling the circulation circuit 50 is circulated in the circulation circuit 50 through the circulation pump 36, the heat exchanger 38, the introducing pipe 39, the introducing part 18, the space 12, the turn-back part 17, the space 14, the discharging pipe 41, and the circulation pump 36 in this order. During this circulation, the LN2 inside the circulation circuit 50 is cooled in the heat exchanger 38 by exchanging heat with the LN2 (24) inside the reservoir tank 22 cooled by the refrigerator 28. The superconductor 60 is cooled by the LN2 inside the circulation circuit 50 cooled by heat exchange with the heat exchanger 38 flowing through the space 14.

Second Embodiment

The superconducting feeder cable according to the first embodiment described using FIGS. 3 and 4 is the most appropriate as the first superconducting feeder because it is easier to connect the power leads along the cable and there is less possibility of damaging the polytetrafluoroethylene pipe being the inner tube. However, the Go-Flow is merely a supply source to the Return-Flow, and thus it is desirable to further improve the efficiency in utilizing the coolant. Herein, the first superconducting feeder cable is the superconducting cable such that the power leads are provided so as to directly supply electricity to the trolley line.

In order to further improve the efficiency in utilizing the coolant, the inventors considered providing a combined superconducting feeder cable additionally for the superconducting feeder cable, which enables not only the electric transmission to the electric train car, but also the electric transmission only between the substations, and arrived at the completion of the invention.

The superconducting feeder cable only for the substations is referred to as the second superconducting feeder cable, and the superconducting feeder cable as a whole is referred to as the combined superconducting feeder cable.

Figure 6:
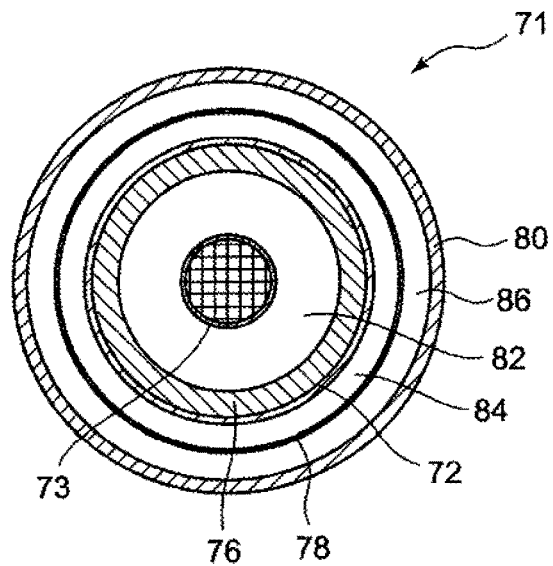
FIG. 6 is a cross-sectional view of the combined superconducting feeder cable according to the second embodiment.
Figure 7:
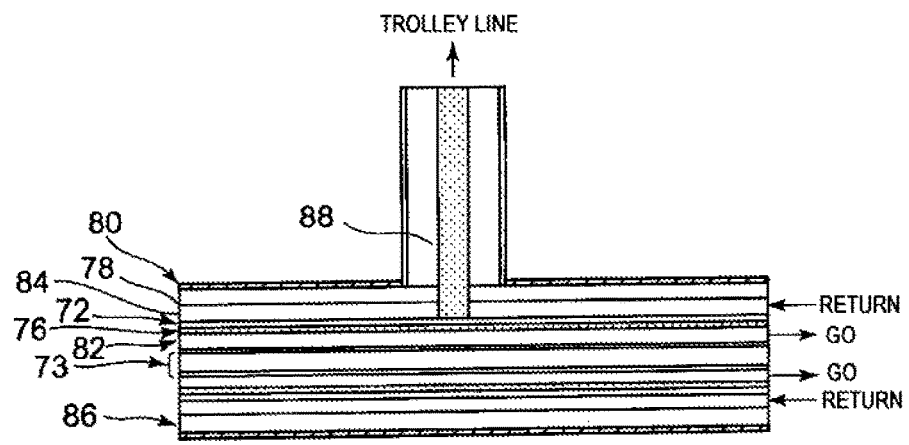
FIG. 7 is a block diagram of the power lead and its surrounding parts of the combined superconducting feeder cable according to the second embodiment.

FIG. 6 is a cross-sectional view of the combined superconducting feeder cable according to the second embodiment. FIG. 7 is a block diagram of the power lead and its surrounding parts of the combined superconducting feeder cable according to the second embodiment.

In FIGS. 6 and 7, for the superconducting feeder cable 71, the second superconducting feeder cable 73 to be cooled is coaxially inserted into an inner tube 76, which is a pipe formed of polytetrafluoroethylene being a heat insulating material. The inner tube 76 is inserted coaxially into an outer tube 78, which is coaxially inserted into a vacuum sheath 80. Also, on the outer circumference of the inner tube 76, the first superconducting feeder cable 72 is wound around to be attached. The LN2 being the Go-Flow coolant flows through the space 82 formed between the second superconducting feeder cable 73 and the inner tube 76, and the LN2 being the Return-Flow coolant flows through the space 84 formed between the first superconducting feeder cable 72 and the outer tube 78. The space 86 between the outer tube 78 and the vacuum sheath 80 is maintained vacuum to form a heat insulating layer. In the configuration shown in FIG. 6, the second superconducting feeder cable 73 to be cooled is cooled by the Go-Flow LN2 flowing through the space 82, while the first superconducting feeder cable 72 is cooled by the Return-Flow LN2 flowing through the space 84.

According to the combined superconducting feeder cable shown in FIGS. 6 and 7, it is possible to achieve two separate electric transmission systems without changing the superconducting cable of the first embodiment shown in FIGS. 3 and 4 and the flow of the coolant LN2 at all.

Next, an example of usage of the combined superconducting feeder cable according to the second embodiment will be described.

Figure 8:
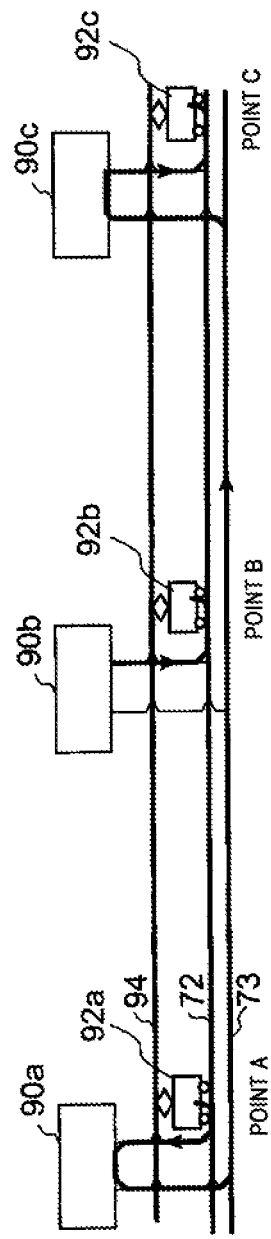
FIG. 8 is a block diagram of the power network of the electric railway in which the combined superconducting feeder cable according to the second embodiment.

FIG. 8 is a block diagram of the power network of the electric railway in which the combined superconducting feeder cable according to the second embodiment is used. In FIG. 8, only the first superconducting cable 72 and the second superconducting cable 73 of the combined superconducting feeder cable 71 are shown, omitting other parts of the configuration parts of the combined superconducting feeder cable 71 such as the inner tube 76 and the outer tube 78.

In FIG. 8, considered is the case where a large volume of electricity is used upon the electric railway vehicle 92b running at top speed at point B. At this time, the substation 90b closest to point B serves to supply electricity to the electric railway vehicle 92b.

Further considered is the case where there is an electric railway vehicle 92a under regenerative breaking at point A shown in FIG. 8, and on the other hand, there is an electric railway vehicle 92c accelerating at point C on the opposite side of point A across point B.

In this case, provided that there is only the first superconducting feeder cable 72, the generated power of the electric railway vehicle 92a cannot be distributed to the electric railway vehicle 92c when the substation 90b has no allowance. However, in the present embodiment, the second superconducting feeder cable 73 is provided, which makes it possible to supply the regenerative energy of the electric railway vehicle 92a to the accelerating electric railway vehicle 92c via the substation 90a, the second superconducting feeder cable 73, and the substation 90c in this order. Accordingly, by providing and using the second superconducting feeder cable 73 for interchange of electricity among the substations, it is possible to considerably improve the efficiency of power use for the electric railway.

Also, it is possible to provide the second superconducting feeder cable 73 inside the inner tube 76 as shown in FIGS. 6 and 7, because the superconducting feeder cable 73 is used for interchange of electricity among the substations and thus not connected to any power lead on the way. Moreover, it is possible for the first superconducting feeder cable 72 to supply electricity to the electric railway vehicle independently of the existence of the second superconducting feeder cable 73, because the second superconducting feeder cable 73 has direct current, which prevents electric loss and temperature increase of the LN2 being a coolant.

In the second embodiment, the following advantageous effects can be obtained in addition to the effects similar to that of the first embodiment.

It is possible to considerably improve the efficiency of power use that is capable of achieving two separate systems of electric transmission. Also, while the second superconducting feeder cable that redistributes electricity over the substations is disposed inside the inner tube 76 made of polytetrafluoroethylene and is cooled by the outgoing LN2 that flows inside the inner tube 76, the superconducting feeder cable has direct current and therefore does not increase the temperature of the LN2 at all. In the case where a refrigerator for the superconducting feeder cable is provided inside a substation, it is easy to address the heat load of the power lead of the second superconducting feeder cable because the power lead is disposed near the refrigerator, the heat load having influence on the temperature increase of the Go-Flow LN2.

INDUSTRIAL APPLICABILITY

For a superconducting cable that has direct current and is laid in only one line such as the superconducting feeder cable, it is possible is to apply as a device and a method for cooling the superconducting cable which are capable of effective cyclic use of the low temperature of the coolant without separately providing a returning line for the coolant.

The invention claimed is:
1. A power supplying system comprising:
a trolley line;
a plurality of substations;
a superconducting cable connecting the plurality of substations with each other; and
at least one power lead connecting the trolley line and the superconducting cable,
wherein the superconducting cable comprises:
an inner tube forming an outgoing coolant passage inside the inner tube;
an outer tube disposed on an outer circumferential side of the inner tube and forming a returning coolant passage between the inner tube and the outer tube;
a first superconductor disposed between the inner tube and the outer tube and connected to the trolley line via said at least one power lead; and
a second superconductor without any connection to a power lead, the second superconductor being disposed inside the inner tube and configured to distribute power among the substations that are connected with each other via the superconducting cable.
2. The power supplying system according to claim 1, wherein the inner tube is formed of heat insulating material, and
wherein the first superconductor is wound around an outer surface of the inner tube.
3. The power supplying system according to claim 2, wherein the inner tube is formed of a polytetrafluoroethylene or a nylon.
4. The power supplying system according to claim 1, wherein the outer tube is a corrugated pipe.
5. The power supplying system according to claim 1, comprising:
a circulation circuit capable of returning coolant discharged from an outlet of the returning coolant passage of the superconducting cable to an inlet of the outgoing coolant passage of the superconducting cable with a pump; and
a cooling part that cools the coolant inside the circulation circuit.
6. The power supplying system according to claim 5, wherein the pump is configured to discharge the coolant having a volume flow V that satisfies a relation $h \leq CV/L$,
where h is a coefficient of heat transfer of a material of the inner tube, C is a heat capacity per unit length of the coolant, and L is an entire length of the superconducting cable.
7. A cooling method for the power supplying system according to claim 1, comprising the steps of:
while supplying coolant to the outgoing coolant passage continuously, taking the coolant out from the returning coolant passage;
cooling the coolant taken out from the returning coolant passage; and
supplying again the coolant to the outgoing coolant passage, whereby the coolant is cyclically used.
8. The cooling method for the power supplying system according to claim 7,
wherein the coolant is continuously supplied to the outgoing coolant passage, the coolant having a volume flow V that satisfies a relation h CV/L, where h is a coefficient of heat transfer of a material of the inner tube, C is a heat capacity per unit length of the coolant, and L is an entire length of the superconducting cable.

* * * * *

UNITED STATES PATENT AND TRADEMARK OFFICE
CERTIFICATE OF CORRECTION

PATENT NO. : 10,062,478 B2
APPLICATION NO. : 14/365428
DATED : August 28, 2018
INVENTOR(S) : Noriharu Tamada et al.

Page 1 of 1

It is certified that error appears in the above-identified patent and that said Letters Patent is hereby corrected as shown below:

Claim 8, Column 14, Line 37 should read as --flow V that satisfies a relation $h \leq CV/L$, where h is a--

Signed and Sealed this
Twenty-fifth Day of December, 2018

Andrei Iancu
*Director of the United States Patent and Trademark Office*